United States Patent [19]
Hatzis et al.

[11] Patent Number: 5,261,608
[45] Date of Patent: Nov. 16, 1993

[54] MULTI-LINE FLUID SUPPLY MANIFOLD ASSEMBLY

[75] Inventors: Stephen Hatzis, Trumbull; Adrian Papanide, Seymour, both of Conn.

[73] Assignee: Avco Corporation, Providence, R.I.

[21] Appl. No.: 2,199

[22] Filed: Jan. 8, 1993

[51] Int. Cl.⁵ .................................................. F02M 55/00
[52] U.S. Cl. ..................................... 239/450; 239/600; 123/469
[58] Field of Search ............... 285/137.1, 150, 62; 123/470, 468, 469; 239/450, 600, 548

[56] References Cited

U.S. PATENT DOCUMENTS

| | | | |
|---|---|---|---|
| 4,162,041 | 7/1979 | Hane | 239/450 X |
| 4,474,160 | 10/1984 | Gartner | 239/600 X |
| 4,587,477 | 5/1986 | Field et al. | 123/468 |
| 4,759,505 | 7/1980 | Delaplace et al. | 239/600 X |
| 4,909,221 | 3/1990 | Heusen | 239/600 X |

Primary Examiner—Andres Kashnikow
Assistant Examiner—Kevin P. Weldon
Attorney, Agent, or Firm—Perman & Green

[57] ABSTRACT

A multi-line fluid supply manifold assembly comprising multiple parallel fluid supply lines for supplying fluid through a common block section to a fluid-receiving member. The assembly contains individual fluid supply fittings to which the fluid supply lines are attached, such as by crimping. The fluid supply fittings are detachable from the assembly so that the fuel lines can be crimped thereto without interference.

6 Claims, 1 Drawing Sheet

MULTI-LINE FLUID SUPPLY MANIFOLD ASSEMBLY

BACKGROUND OF THE INVENTION

The present invention relates to an improved fluid-supply manifold connectable to a plurality of closely-spaced, parallel fluid supply lines, such as fuel supply lines, and attachable to a fluid-receiving member, such as a fuel injector, for purposes of feeding fluid to the fluid-receiving member through a plurality of supply lines.

Multi-line fluid supply manifolds are known having a plurality of closely-spaced parallel inlet connections to which supply lines, such as rigid fuel lines, are attached such as by compression fittings. Such known manifold systems present a space problem which interferes with the connection and disconnection of closely-spaced supply lines to the manifold, whereby it is difficult to attach or detach the fittings of one flexible supply line due to the closeness of the fittings present on an adjacent supply line.

In the case of high temperature installations, such as fuel injectors on gas turbine engine housings, the heat of the engine housing induces high temperature stresses in the fuel supply manifold which can lead to line splitting and failure during operation. Disconnection and replacement of the manifold and the connected fuel lines is difficult and time-consuming.

Also, while it is advantageous to use multi-line fuel manifolds having flexible supply lines on gas turbine engines, because of the limited amount of space available, such has been difficult with prior-known multi-line manifolds. Flexible fuel supply lines conveniently are connected to the manifold inlets by means of crimped metal sleeves or tightenable clamps. However, the lack of space between the parallel fuel inlets on a multi-line supply manifold prevent the crimping or tightening of sleeves or clamps on closely-spaced flexible fuel lines or hoses.

SUMMARY OF THE INVENTION

The present invention relates to a novel multi-line fluid supply manifold assembly comprising a manifold block section and a plurality of nestable manifold fitting members which are attachable to and detachable from the block section in closely spaced, parallel relation. Each fitting member is separable from the block section, for connection to two fluid supply lines by crimping or other means and then re-connectable to the block section in sealing engagement therewith by means of a single bolt, whereby each fitting member can be disconnected from the assembly without detaching the manifold block section from the engine, and can be secured to opposed fuel supply lines, such as flexible lines, to couple them without interference with or from the fitting members of other lines which are closely-spaced therefrom in the final manifold assembly.

THE DRAWINGS

DETAILED DESCRIPTION

Figure 1:
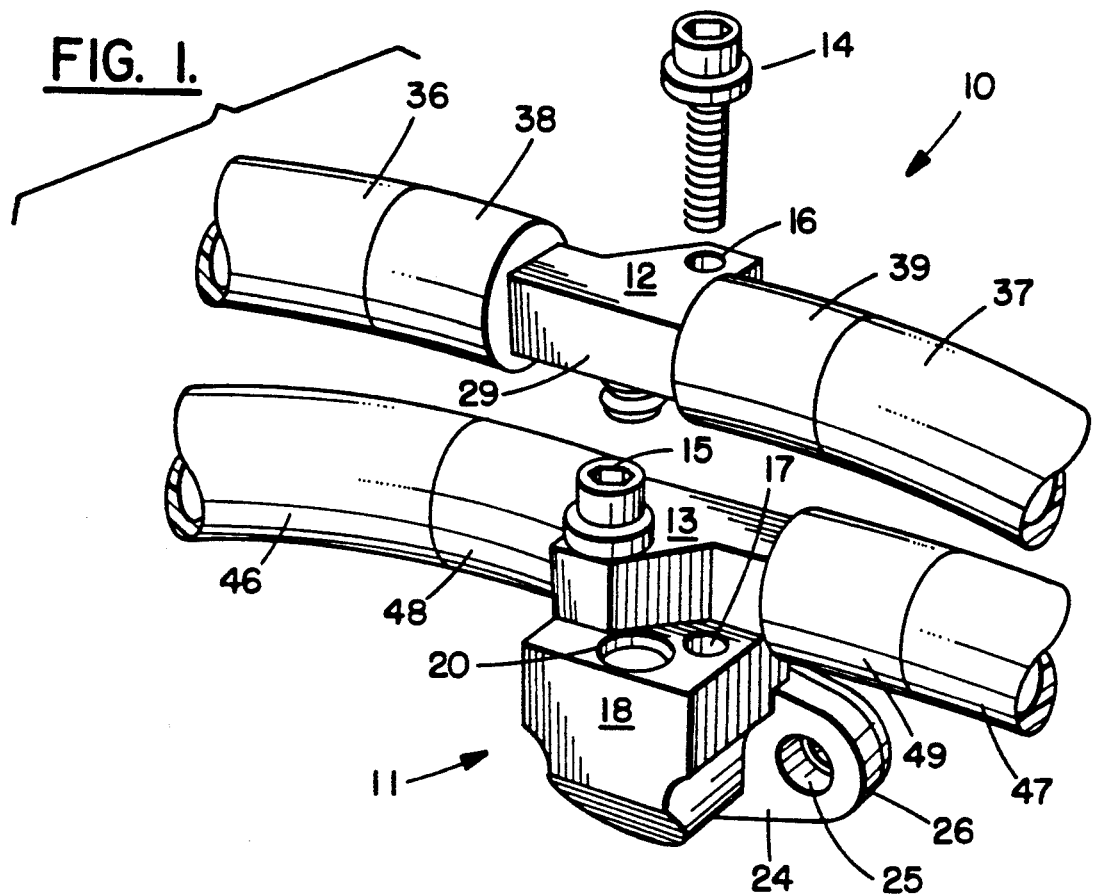
FIG. 1 is a perspective view of a multi-line fluid supply manifold assembly for a plurality of flexible fluid supply lines or tubes, one of the manifold fitting members being illustrated is detached, spaced position for purposes of illustration.

Referring to the drawings, the present manifold assembly 10 comprises a common block section 11 and a pair of mating manifold fitting members 12 and 13 each being fastenable to the block section 11 by a bolt member 14 or 15 which passes through a bore 16 in the fitting member 12 or 13 and is tightenable into a threaded bore 17 in the block section 11.

The block section 11 comprises a housing 18 enclosing a central manifold chamber and having top inlet wells 20 and 21 on the upper surface thereof, each of which open downwardly through inlet passages 22 and 23 to the central chamber. The housing 18 of the block section 11 also comprises a side mounting flange 24 having a pair of bolt holes 25 to receive attachment bolts for connection to a fluid receiving member such as a fuel injector or burner. A gasket 26 is provided for sealing the connection to the fluid receiving member. The block section 11 includes a side outlet collar 27 which threadably engages a fluid spray nozzle member 28 which is designed to fit into a fluid-receiving passage, when mounted on the fluid-receiving member, to provide fluid communication with the manifold chamber of the block section housing 18.

The present assembly is designed so that the block section 11 can be bolted to the fluid receiving member, and the fitting members 12 and 13 can be separated from the block section, without disturbing the mounting between the block section 11 and the fluid receiving member whenever it becomes necessary to attach new fuel supply lines to the fittings 12 or 13.

As shown by the drawings, the fitting 12 comprises a T-shaped housing 29 having linear inlet and outlet sleeves 31 and 32, forming a linear bore 30, and a transverse bore 33 which communicates with the linear bore 30 and extends down through a supply collar fitting 34 fitted with O-rings 35. When assembled onto the block 11, the supply fitting 34 seats within the inlet well 20 in fluid-tight engagement, provided by the O-rings 35, and the bolt member 14 is tightened in place. However, before such assembly, the flexible fuel inlet and outlet lines 36 and 37 are secured to the sleeves 31 and 32, such as by mechanically crimping metallic fastener collars 38 and 39 over the flexible lines 36 and 37 to provide sealing engagement with the fitting sleeves 31 and 32. Thus, the attachment of the fuel lines 36 and 37, or the replacement and reattachment thereof, is accomplished while the manifold fitting 12 is detached from the block section 11 and spaced from the companion manifold fitting 13 so that the line attachment and crimping operations can be accomplished without interference with the remainder of the assembly.

The manifold fitting 13 is similar to fitting 12 discussed above and comprises a T-shaped housing having linear inlet and outlet sleeves 40 and 41, forming a linear bore 42, a transverse bore 43 through a supply collar fitting 44 provided with O-rings 45 for sealing engagement within the other inlet well 21 of the block 11 when secured to the block by bolt member 15. The flexible fuel inlet and outlet lines 46 and 47 of the fitting 13 are secured over the inlet and outlet sleeves 40 and 41, after the fitting 13 is detached and spaced from the block 11, by crimping metallic fastener collars 48 and 49 thereover, as illustrated by FIG. 1.

Figure 2:
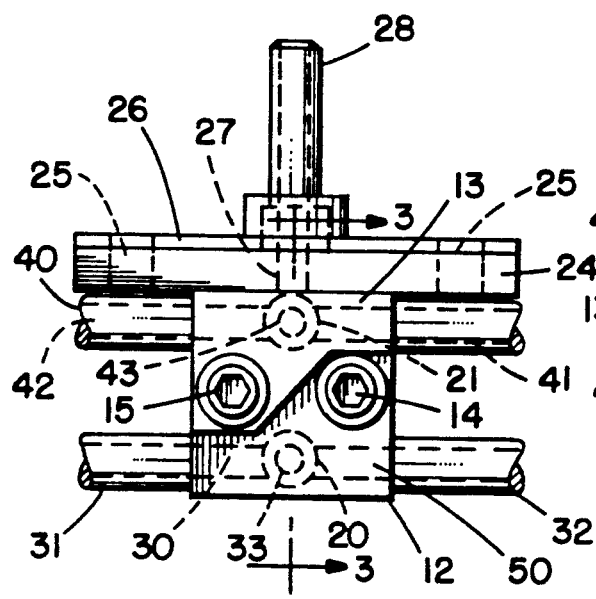
FIG. 2 is a top view of a manifold assembly according to the present invention.
Figure 3:
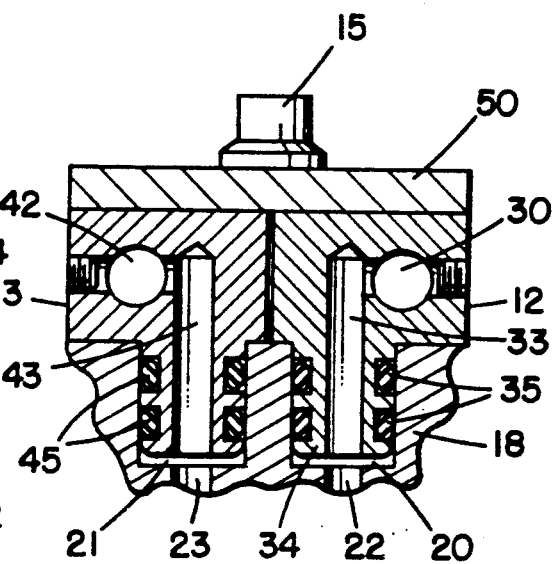
FIG. 3 is a partial cross-section along the line 3—3 of FIG. 2 after the assembly thereof is rotated 90°.

The present assembly preferably includes a top retainer plate 50, shown in FIGS. 2 and 3, which is bolted over the upper surfaces of the manifold fittings 12 and 13 by means of the bolt members 14 and 15 for increased strength and stability, and for redundant retention.

In summary, the present invention provides a multi-line fuel supply manifold assembly comprising multiple parallel fuel lines which are too closely spaced to permit the lines to be crimped thereto or otherwise fastened thereon without interference. The present fuel manifold assembly contains individual T-shaped fuel manifold fittings for each of the fuel lines, each of which fittings can be detached from the block section, spaced therefrom to permit fuel line detachment and attachment, such as by a mechanical crimping tool, without interference with or detachment of the other fuel lines or other assembly components.

It should be understood that while the present drawings illustrate a compact, preferred design for a two-line manifold assembly, other designs will also be suitable within the spirit of the present invention.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. A multiple parallel line fluid supply manifold assembly comprising a block section which is attachable to a fluid-receiving member and has a reservoir chamber having an outlet designed for fluid-tight communication with a fluid receiving member to which the block section is attached, a plurality of individual T-shaped manifold fitting members, each comprising a linear conduit section having inlet and outlet ends to a linear bore therewithin, and each fitting member having an intermediate transverse conduit section having an outlet end and containing a transverse bore which communicates between said linear bore and said outlet end, and a plurality of closely-spaced inlet bores on said block section, opening into said reservoir chamber, each said inlet bore being designed for fluid tight engagement with the outlet end of the transverse conduit section of a manifold fitting member, to support a plurality of said fitting members with the linear bores thereof in close parallel relation to each other, whereby each of said individual fitting members can be separated from said block member for attachment of fluid supply lines to the inlet and outlet ends thereof, without interference with other fitting members which, in the final assembly, are so closely mounted as to interfere with attachment of the fluid supply lines.

2. A manifold assembly according to claim 1 in which each said manifold fitting member is provided with a transverse attachment bore, and said block section is provided with a threaded bore for each manifold fitting member, aligned with the attachment bore thereof when the fitting members are mounted in the final assembly, and an attachment bolt engaged within each aligned attachment bore and threaded bore to secure each of said fitting members to said block section.

3. A manifold assembly according to claim 2 which comprises a top retainer plate overlying all of said manifold fitting members, said plate having a plurality of bores, one aligned with the attachment bore of each of said manifold fitting members, each said attachment bolt being engaged within a retainer plate bore, an attachment bore and a threaded bore to secure said fitting members to said block section.

4. A manifold assembly according to claim 1 in which the outlet end of the transverse conduit section of each said manifold fitting member comprises sealing engagement means for an inlet bore of said block section.

5. A manifold assembly according to claim 4 in which said sealing engagement means comprises a spaced pair of O-rings.

6. A manifold assembly according to claim 1 in which said outlet from the block section comprises a spray nozzle member.

* * * * *